April 14, 1942.  F. M. YOUNG  2,279,808
TUBE ATTACHING MEANS FOR HEAT EXCHANGERS
Filed Oct. 24, 1938
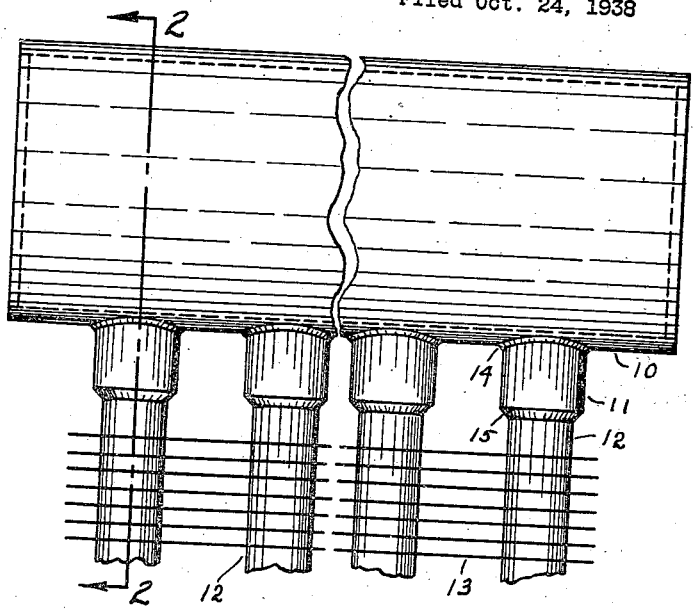
FIG. 1
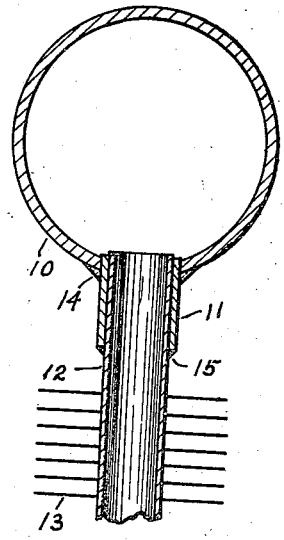
FIG. 2
FIG. 3
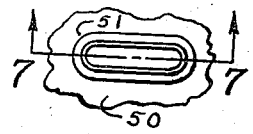
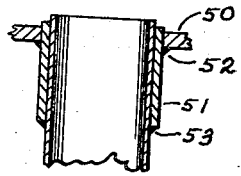
FIG. 4
INVENTOR
FRED M. YOUNG
BY A. S. Krob
ATTORNEY Patented Apr. 14, 1942

2,279,808

UNITED STATES PATENT OFFICE 2,279,808

TUBE ATTACHING MEANS FOR HEAT EXCHANGERS

Fred M. Young, Racine, Wis.

Application October 24, 1938, Serial No. 236,605

2 Claims. (Cl. 285—111)

The manner of securing tubes to tube plates or headers in the past has been very unsatisfactory. Originally solder bonding has been used for making the joint between the tube plate or header. Modern radiators require bonding the joints by brazing or by silver soldering.

The temperature required for high temperature fusion bonding either brazing or silver soldering is generally between 1250° F. and 1600° F.

Nonferrous material or copper is very sensitive to overheating, the results being especially serious in heat exchangers because the point where the greatest vibration and strain occurs is at the point where the tube is secured to the header or tube plate.

In many designs the tubes are necessarily very thin. The tube plates or headers to which the tubes are secured are always considerably thicker than the wall of the tubes and when heat is applied for the bonding or brazing operation, it requires considerable more time to bring the temperature of the tube plate or the header up to the desired point than is required for the tube.

The tube walls are very thin which makes it practically impossible to avoid over-heating before the tube plate or the header reaches the necessary temperature for brazing or silver soldering.

The present invention relates to an improved design and method for making the joint between tubes and headers or tube plates whereby the joint may be made without overheating the tube walls.

In the present invention, I provide means for making two joints between the tubes and the tube plate or header, the first being made with a sleeve being somewhat lighter than the header or tube plate and the second joint being made between the sleeve and the tube, the sleeve being somewhat heavier than the tube. In my device it is a comparatively simple matter to braze or silver solder the sleeves to the tube plate or header without overheating the tube and to soft solder or silver solder the sleeves to the tubes without overheating the tube.

To these and other useful ends my invention consists of parts, combinations of parts or their equivalents, as hereinafter set forth and claimed and shown in the accompanying drawing in which:

Fig. 1 is a fractional front elevation of a header illustrating a number of tubes secured to the header by means of my improvement.

Fig. 2 is a transverse section taken on line 2—2 of Figure 1.

Figures 3 and 4 illustrate my invention applied to flat tubes when associated with flat tube plates or otherwise.

As thus illustrated in Figures 1 and 2, the header is designated by reference numeral 10, the sleeves by reference numeral 11 and the tubes by reference numeral 12. The tubes are provided with the usual fins 13. Sleeve 11 is first placed into position in apertures in header 10 and brazed thereto as at 14 after which the tubes are positioned in the sleeve as illustrated in Figure 2 and the sleeve then bonded to the tube as at 15.

Thus it will be seen that since the wall of the sleeve has considerable thickness it may be brazed to the header without overheating the sleeve and since the sleeve is extended some distance from the header and the wall is not very much thicker than the tube wall, it will be a comparatively simple matter to silver solder or bond the tube to the sleeve without overheating the tube.

By scrutinizing Figure 2 the philosophy of my invention will be apparent. It will be seen that if the tube was placed directly into the header and then an attempt made to braze the tube to the header, it would be very difficult to prevent overheating the tube before the temperature of the header was high enough for brazing.

In Figures 3 and 4 I illustrate my invention as applied to flat tubes wherein suitable openings in the tube plate are made for the reception of sleeves 51, the sleeve being brazed to the plate preferably on the tube side as at 52 and the tube being silver soldered or bonded to the sleeve as at 53. Clearly silver solder or tin solder will answer for bonding the tube to the sleeve because of the long surface between members 11 and 12 or because of the long surface between member 51 and the flattened tube which as in Figures 1 and 2 will be filled with the bonding material.

It will be seen that I have provided means for safely and economically securing tubes to headers or tube plates and that the bonding or brazing may be done without danger of injuring the tube, thus to provide a better and stronger heat exchanger.

Clearly many minor detail changes may be made without departing from the spirit and scope of the present invention as recited in the appended claims.

Having thus shown and described my invention, I claim:

1. A device of the class described, comprising a tube and a tube plate having an aperture, a relatively short sleeve extending through said aperture and being brazed or welded to said tube plate, the outer end of said sleeve extending tubeward for a considerable distance from the plate, said tube extending substantially through said sleeve and being bonded therein after said first brazing or welding operation.

2. A device of the class described, comprising a relatively small tube and a header tube having an aperture, a relatively short sleeve extending through said aperture and being brazed or welded to said header tube, the outer end of said sleeve extending tubeward for a considerable distance from the header, said tube extending substantially through said sleeve and being bonded therein after said first brazing or welding operation.

FRED M. YOUNG.